United States Patent [19]
Montegari et al.

[11] Patent Number: 4,887,289
[45] Date of Patent: Dec. 12, 1989

[54] REMOTE TESTING OF A TRUNK LEADING TO AN AUTOMATIC CALL DISTRIBUTOR

[75] Inventors: David M. Montegari, West Hempstead; Ronald M. Muller, Brooklyn, both of N.Y.

[73] Assignee: New York Telephone Company, New York, N.Y.

[21] Appl. No.: 237,861

[22] Filed: Aug. 29, 1988

[51] Int. Cl.$^4$ .................... H04M 7/06; H04M 3/28; H04B 3/46
[52] U.S. Cl. .......................................... 379/22; 379/29
[58] Field of Search ................. 379/9, 6, 10, 12, 22, 379/29

[56] References Cited

U.S. PATENT DOCUMENTS

| Re. 30,692 | 7/1981 | Ellson . | |
|---|---|---|---|
| 4,065,643 | 12/1977 | Girod | 379/22 |
| 4,087,656 | 5/1978 | Blum et al. . | |
| 4,087,657 | 5/1978 | Peoples . | |
| 4,186,282 | 1/1980 | Ellson . | |
| 4,254,495 | 3/1981 | Bollard . | |
| 4,260,859 | 4/1981 | Aaroen . | |
| 4,314,110 | 2/1982 | Breidenstein et al. . | |
| 4,349,707 | 9/1982 | Perrigault et al. . | |
| 4,361,730 | 11/1982 | Barber et al. . | |
| 4,363,938 | 12/1982 | Daaboul et al. . | |
| 4,366,350 | 12/1982 | Lee et al. . | |
| 4,371,758 | 2/1983 | Ulrich . | |
| 4,418,250 | 11/1983 | Hilligoss . | |
| 4,486,627 | 12/1984 | Beeman et al. . | |
| 4,552,996 | 11/1985 | de Bergh . | |
| 4,574,167 | 4/1986 | Olek . | |
| 4,581,493 | 4/1986 | Gazzo et al. . | |
| 4,611,099 | 9/1986 | Ray et al. . | |
| 4,611,101 | 9/1986 | Walter et al. . | |
| 4,628,158 | 12/1986 | Rubin . | |
| 4,629,836 | 12/1986 | Walsworth . | |
| 4,630,228 | 12/1986 | Tarczy-Hornoch et al. . | |
| 4,646,342 | 2/1987 | Hargrave et al. . | |
| 4,649,335 | 3/1987 | Lassaux et al. . | |
| 4,658,395 | 4/1987 | Blackburn . | |
| 4,663,775 | 5/1987 | Olek . | |
| 4,670,897 | 6/1987 | Parsons et al. . | |
| 4,670,898 | 6/1987 | Pierce et al. . | |
| 4,729,126 | 3/1988 | Olek . | |
| 4,734,933 | 3/1988 | Barsellotti et al. . | |

Primary Examiner—Stafford D. Schreyer
Attorney, Agent, or Firm—Marmorek, Guttman & Rubenstein

[57] ABSTRACT

A circuit and method for enabling the automatic testing of trunks leading to automatic call distributors from a remote testing location is disclosed. In accordance with the invention, when the remote testing location wishes to test a trunk leading to an automatic call distributor, tones are generated which enable the remote testing location to be connected to a test line of the automatic call distributor rather than to an operator position.

10 Claims, 10 Drawing Sheets

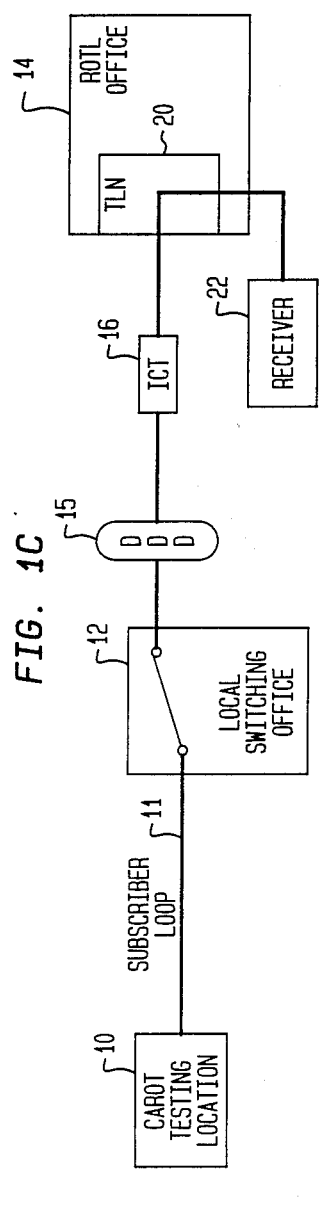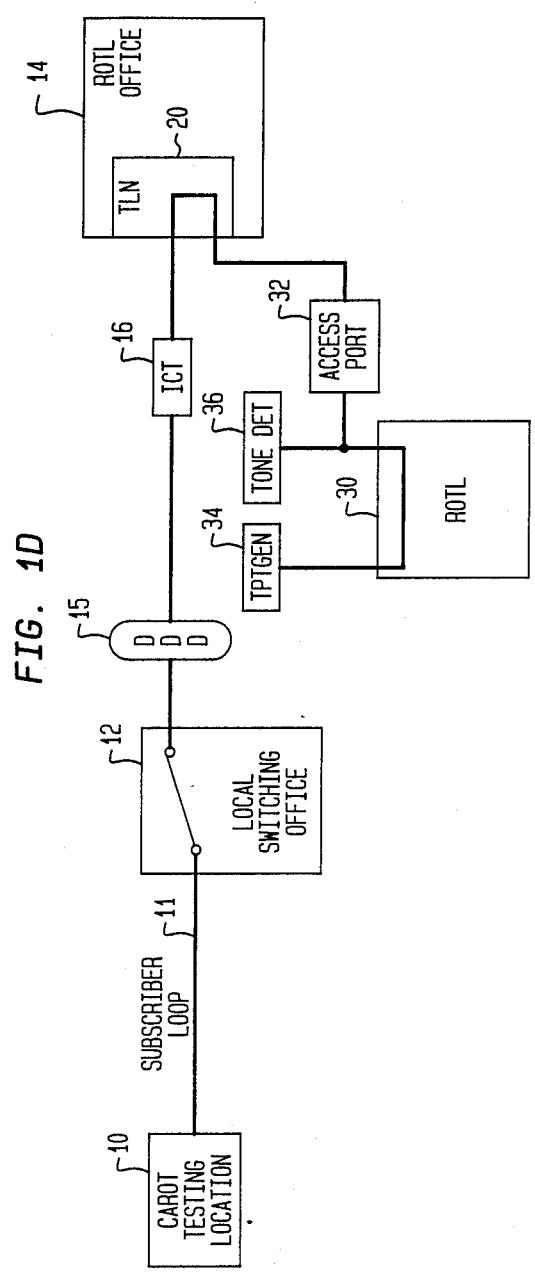

REMOTE TESTING OF A TRUNK LEADING TO AN AUTOMATIC CALL DISTRIBUTOR

FIELD OF THE INVENTION

The present invention relates to a circuit and method for the automatic testing of directory assistance trunks or other trunks leading to an Automatic Call Distributor (ACD) of a telephone network.

BACKGROUND OF THE INVENTION

A telephone network typically comprises an array of switching offices which are interconnected by trunks. Typically, individual users are connected to particular local switching offices by way of subscriber loops. A typical telephone conversation between first and second users involves the subscriber loop connecting the first user to its local switching office, a plurality of trunks and other switching offices connecting the local switching office of the first user to the local switching office of the second user, and the subscriber loop connecting the second user to its local switching office. Illustratively, the switching offices may be No. 1 or No. 1A ESS switching offices or No. 5 crossbar switching offices.

In general, trunk lines in a telephone network are tested automatically, illustratively, by determining losses at various frequencies. The trunk lines to be tested are chosen under the control of a computerized system known as Centralized Automatic Reporting on Trunks (CAROT). In addition to choosing the trunks to be tested, the CAROT system receives and analyzes data representing test results from particular trunks.

The CAROT computer is typically located at a remote test location in the telephone network which is connected to a local switching office via a subscriber loop. The remote test location can set up a test of a trunk connecting a near end switching office and a far end switching office. The near end switching office is a type of switching office known as a ROTL (Remote Office Test Line) office. A ROTL switching office is a switching office which contains a ROTL frame circuit. The ROTL frame can selectively test any trunk leaving the ROTL office upon receipt of appropriate test priming information from the remote test location containing the CAROT computer. The ROTL frame includes a ROTL applique circuit which serves as an interface between various elements associated with the ROTL frame such as ports, responders, tone detectors, and test progress tone generators. Illustratively, the hardware connections of the ROTL applique circuit may be controlled by a ROTL program which is resident in the central processor of the ROTL switching office.

A test of a trunk connecting a near end or ROTL office and a far end office is set up as follows. A connection is first set up between the remote test location and the near end or ROTL office via the telephone network. Priming information concerning the test to be carried out is transmitted from the remote test location via the ROTL applique circuit to a receiver in the near end switching office. The test priming information includes information concerning the trunk to be tested and the identity of a far end test line which is a test line to be connected to the trunk to be tested by the far end switching office. The priming information is used to set up a connection between the near end office and the far end office via the trunk to be tested. More particularly, a connection is established by way of the trunk to be tested between a near end responder, which is connected to a near end test line associated with the near end switching office, and a far end responder which is connected to the far end test line. To set up the connection to the far end test line, the near end switching office, under the control of its central processor, transmits a directory number indicative of the far end test line to the far end switching office via the trunk to be tested. The far end switching office, under the control of its own central processor, then connects the trunk to be tested to the far end test line.

Once the desired connections are set up, the CAROT computer informs the near end responder and/or far end responder as to the type of test to be carried out. The tests are carried out by transmitting signals between the near and far end responders via the trunk under test. Once the tests are carried out the results are transmitted back to the CAROT computer.

Unfortunately, the above-described mechanism cannot be used to set up a test of a trunk leading to an ACD such as a No. 5 ACD. An ACD is used, for example, to route a request for directory assistance to an available operator position. A near end switching office such as a No. 1 ESS transmits a request for directory assistance by placing a short circuit across the relevant trunk line leading to the ACD. The request is then routed under the control of a marker or other central processing unit in the ACD to an available operator position. As normally configured, a near end switching office, such as a No. 1 or No. 1A ESS or a No. 5 crossbar, cannot cause a connection to a specific operator position associated with an ACD to be established by transmitting to the ACD a directory number indicative of the specific operator position. The ACD merely sets up connections to available operator positions in response to service requests communicated in the form of short circuits via a trunk leading to the ACD. Similarly, a ROTL switching office cannot normally cause a connection with a test line of ACD to be established by transmitting a number indicative of the test line to the ACD. Thus, a trunk leading to an ACD cannot normally be tested from the remote CAROT testing location.

Accordingly, trunks leading to an ACD are tested manually. Such manual testing is slow and expensive and as a result may not be performed as often as desired. Accordingly, service quality problems have plagued trunks leading to ACDs more frequently than other kinds of interoffice trunks.

In view of the above, it is an object of the present invention to provide a mechanism which enables trunks leading to ACDs to be tested automatically by the CAROT computer from a remote test location.

SUMMARY OF THE INVENTION

In accordance with the present invention, trunks leading to an ACD may be tested from a remote CAROT testing location through use of a trunk interface circuit which is included at a ROTL switching office. The trunk interface circuit enables a responder to monitor test priming information transmitted from the remote test location to the ROTL switching office. The trunk interface circuit contains a match circuit which indicates from the priming information when a trunk leading to an ACD is to be tested. When such a trunk is to be tested, a tone generator in the trunk interface circuit generates tones which are transmitted to the ACD from the ROTL office via the trunk line to be tested. The tones are detected by a tone detector associated with a marker or other central processing unit in the ACD. The tones cause a connection to be set up between the incoming trunk to be tested and a particular far end test line which in turn is connected to a responder. This connection permits the trunk leading to the ACD to be tested from a remote CAROT testing location.

If the inventive trunk interface were not present in the ROTL office, the ROTL office would treat the test priming information, indicating a trunk leading to an ACD is to be tested, as it would any request for directory assistance and simply apply a short circuit to the trunk. The ACD would interpret the short circuit as a request for service and set up a connection to any available operator position. It is the inventive trunk interface circuit which monitors the test priming information and generates tones which enable the ACD to set up a connection involving a specific far end test line so that the trunk leading to the ACD can be automatically tested using the CAROT system.

BRIEF DESCRIPTION OF THE DRAWINGS

FIGS. 1A-1H schematically illustrate the testing of an interoffice trunk using the CAROT system.

DETAILED DESCRIPTION OF THE INVENTION

Before describing how a trunk leading to an automatic call distributor may be automatically tested from a remote test location using the CAROT system, it is useful to briefly describe how a standard interoffice telephone trunk is tested using the CAROT system.

Figure 1A:
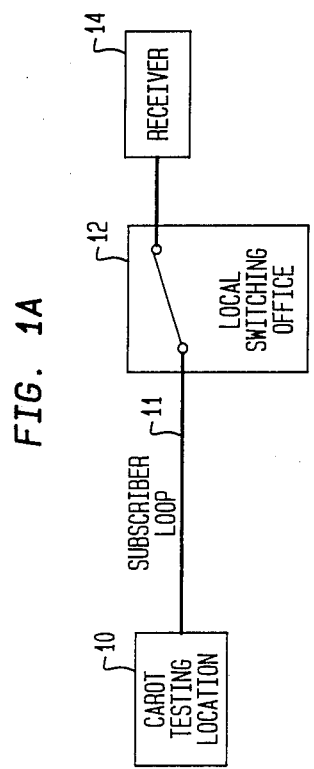

Turning to FIG. 1A, a portion of a telephone network is illustrated. A remote testing location 10 of the network contains a CAROT computer. The testing location 10 can automatically test a remotely located trunk through the sequence of steps described below in connection with FIGS. 1A through 1H.

First, the testing location 10 seizes a subscriber loop 11. The subscriber loop 11 connects the remote testing location 10 to a local switching office 12. Illustratively, the local switching office is a No. 1 or No. 1A ESS office. The testing location 10 then receives a dial tone and a 7- or 10-digit number is dialed. This number may be dialed using pulse or tone dialing. The dialed telephone number is received by a receiver 14, which is connected to the local switching office 12. The receiver 14 may be a dial pulse or tone receiver depending on the type of dialing used.

Figure 1B:
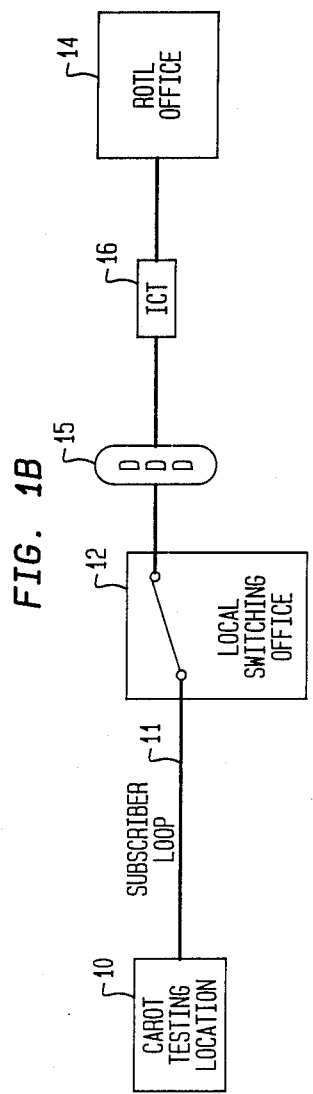

As shown in FIG. 1B, the call is routed to another switching office 14. The call is routed to the switching office 14 via the direct distance dial (DDD) network 15 and arrives at the switching office 14 via the incoming trunk 16. Illustratively, the office 14 is a No. 1 or No. 1A ESS office. The office 14 is a ROTL (Remote Office Test Line) office which means it includes a ROTL applique circuit.

As shown in FIG 1C, when the call arrives at the ROTL office 14 it is connected by the trunk link network 20 to an appropriate receiver 22. The trunk link network 20 is a switching matrix which forms part of the office 14. The receiver 22 is a multi-frequency receiver as interoffice signalling generally utilizes a multi-frequency format.

After the number dialed by the CAROT computer in the remote test location is received by the receiver 22 of FIG. 1C, a translation is performed in the switching office 14. This translation indicates the call is attempting to reach the ROTL applique circuit 30 of FIG. 1D. At this time, a program resident in the central processor (not shown) of the office 14 which controls the ROTL applique circuit is notified of the call. This program is known as the ROTL program. Upon being notified of the call to the ROTL applique circuit, the receiver 22 of FIG. 1C is released. As shown in FIG. 1D, the ROTL program then establishes a connection from the incoming trunk 16 to an access port 32 associated with the ROTL applique circuit 30. At this time, a test progress tone (TPT) generator 34 generates a test progress tone which is sent back to the remote test location 10 to confirm the connection to the ROTL applique circuit 30. A tone detector 36 is continuously connected to the access port 32 of the ROTL applique circuit. The tone detector 36 listens for a recycle command from the remote testing location 10 which would serve to terminate or recycle the test procedure during one of the subsequent steps to be discussed below. As indicated above, the ROTL applique circuit primarily serves as an interface for selectively connecting various elements such as ports, tone detectors, test lines, etc. The hardware connections of the ROTL applique circuit are controlled by the ROTL program.

Figure 1E:
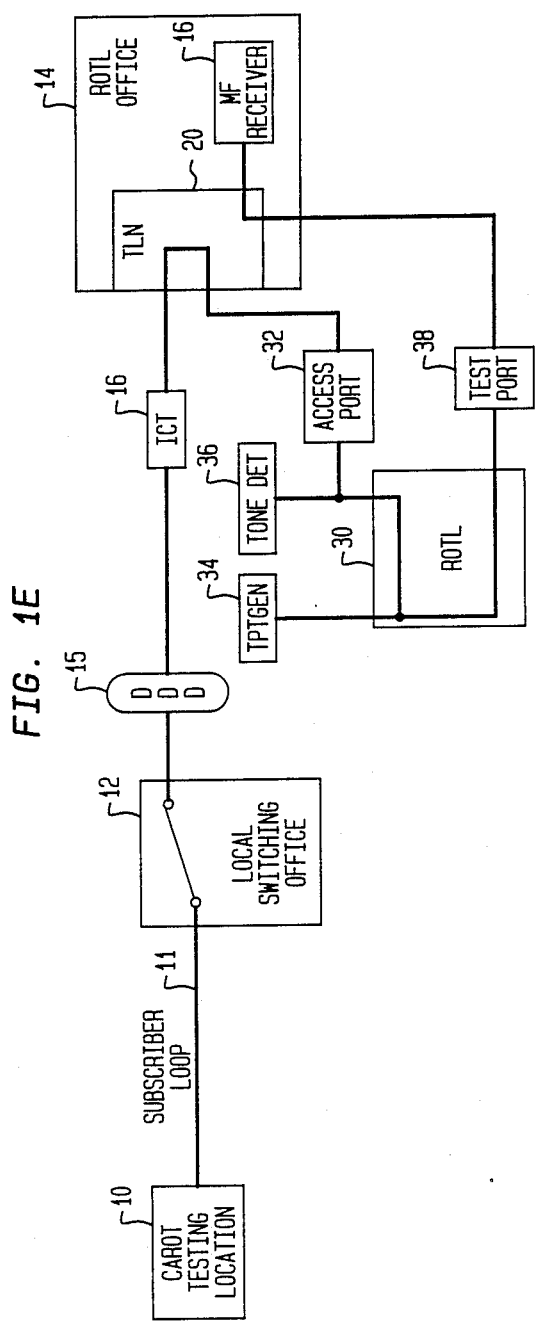

Turning now to FIG 1E, after the connection from the incoming trunk to access port 32 of the ROTL applique circuit is established, the ROTL program seizes a test port 38 associated with the ROTL applique circuit 30. The switching office 14 treats this seizure as if it came from outside the switching office 14 and connects a multi-frequency (MF) receiver 40 to the test port 38. A wink signal is then sent by the test port 38 to the ROTL applique circuit to confirm the readiness of the MF receiver 40. This wink signal is received by the ROTL applique circuit which then disconnects the test progress tone generator 34 from the access port 32 so as to cut off the above-mentioned test progress tone being transmitted back to the remote testing location. The access port 32 and test port 38 are then bridged together through the ROTL applique circuit.

At this time, the remote test location 10 transmits test priming information to the MF receiver 40. The test priming information is transmitted from the remote testing location 10 via the subscriber loop 11, the local switching office 12, the direct distance dial network 15, the incoming trunk 16, the trunk link network 20 of the ROTL office 14, the access port 32, the ROTL applique circuit 30, the test port 38, and the trunk link network 20 to the receiver 40. The test priming information includes the following:

a. the trunk to be tested including the identity of the outgoing trunk from the switching office 14
   b. the far end test line (FETL) on which the test terminates including the directory number used to reach the far end test line, and
   c. the type of test to be conducted.

After receiving the test priming information the receiver 40 is released and the ROTL program analyzes the test request for consistency and validity. If any errors are detected, the ROTL applique circuit under ROTL program control returns a tone to the remote test location and waits for a recycle command to be detected by the tone detector 36.

Figure 1F:
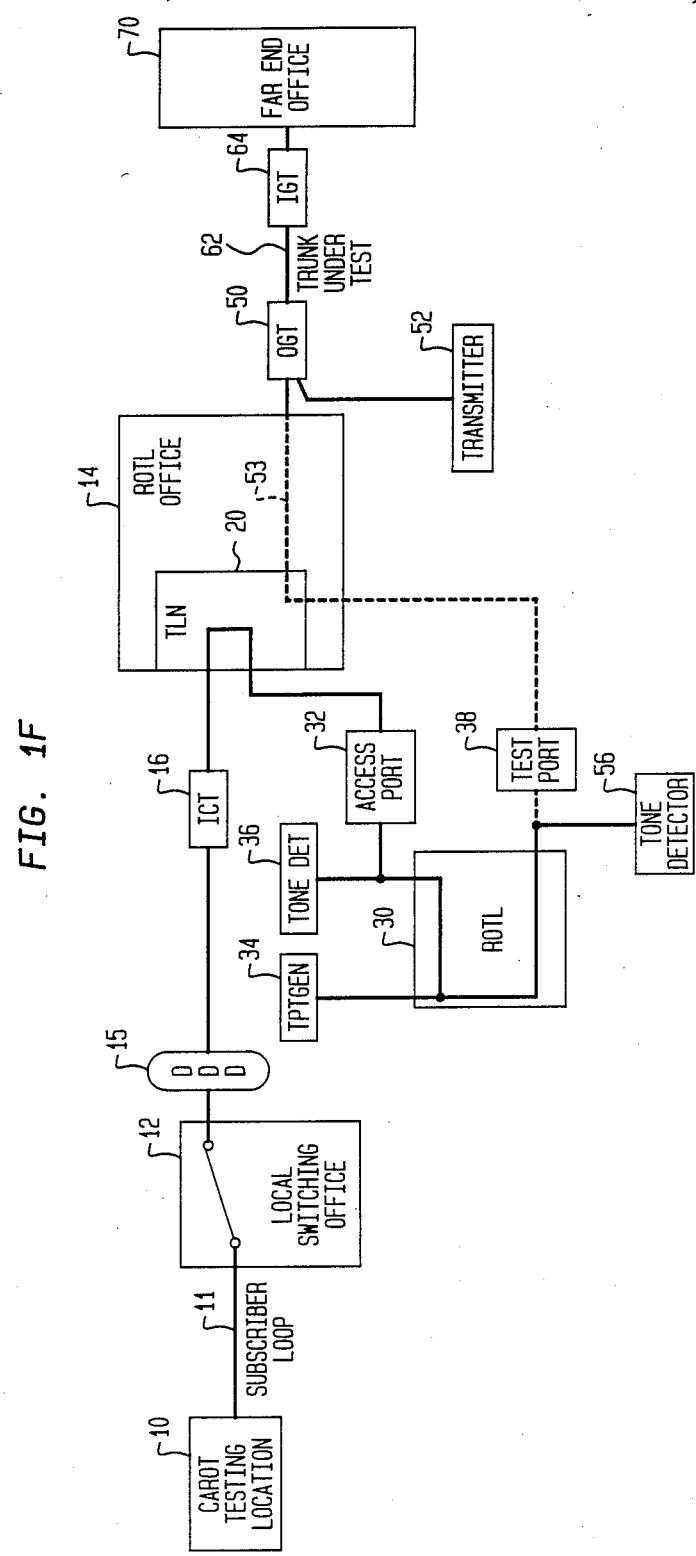

Turning to FIG 1F, it should be noted that the trunk 62 to be tested (as indicated by the test priming information) terminates in the near end or ROTL office 14 as an outgoing trunk (OGT) 50 and at the far end switching office 70 as an incoming trunk (ICT) 64. If the desired outgoing trunk 50 is available, it is reserved for use by the ROTL program. A test progress tone is sent to the remote testing location indicating a valid test request. The ROTL program then passes the directory number (DN) of the far end test line received from the remote test location as part of the test priming information to the call processing programs resident in the switching office 14, with a request that the directory number be transmitted in proper signal format via the desired outgoing trunk 50. The call processing programs select an appropriate transmitter 52 to make the desired call. After the far end test line directory number is transmitted and the transmitter 52 is released, the outgoing trunk 50 is connected to the ROTL applique circuit via a reserve path 53 through the trunk link network 20 of the switching office 14 and the test port 38. The tone detector 56 is also connected to the ROTL applique circuit.

Figure 1G:
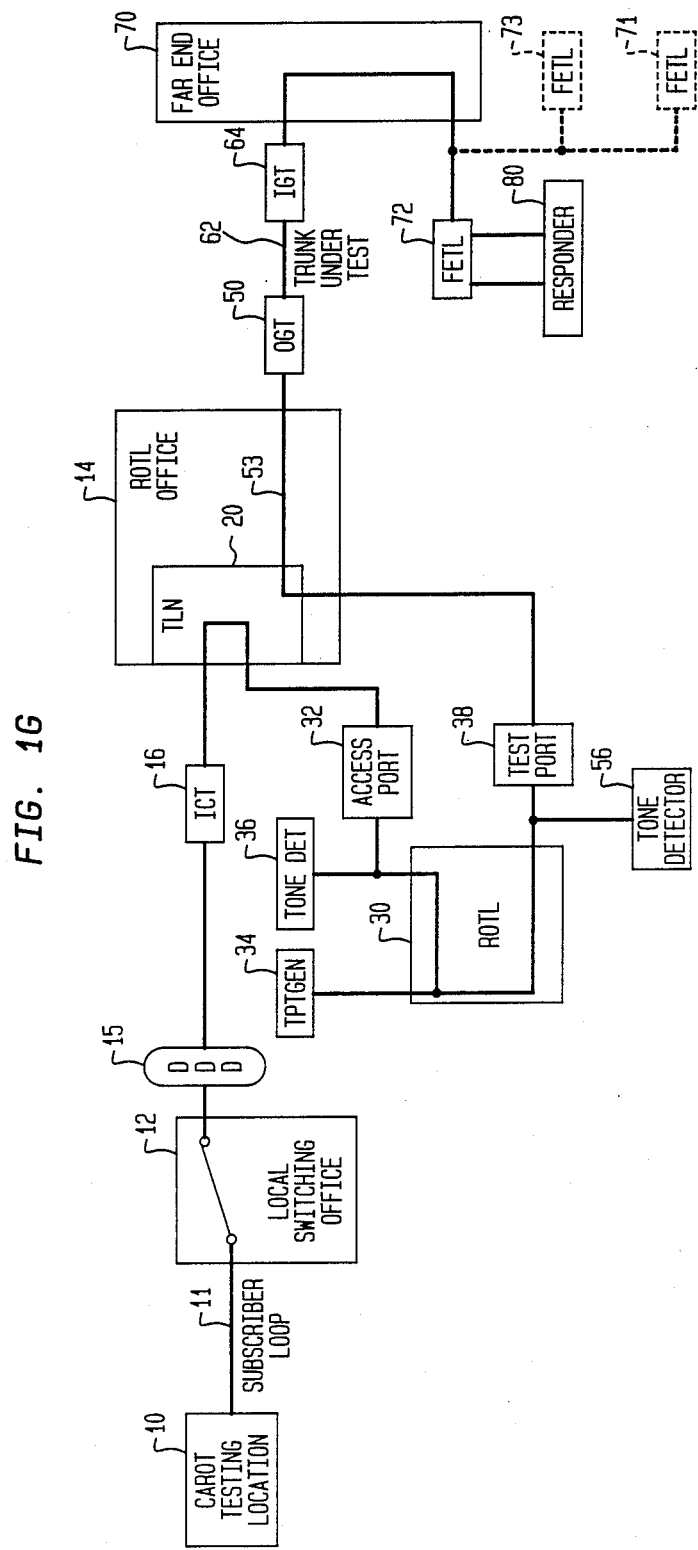

Turning to FIG. 1G, after receipt of the far end test line directory number, the far end office 70 connects the trunk 62 to be tested to the far end test line 72 specified by the directory number. Note that the far end office 70 is associated with a number of other test lines, e.g., 73, 74, which may be connected to a particular incoming trunk depending on the type of test to be performed. The far end test line 72 transmits a test progress tone indicating that the test line 72 is available for testing. This test progress tone is detected by the tone detector 56 at the ROTL office 14. The test progress tone from the test line 72 continues until the responder 80 is connected thereto. At this point, the test progress tone stops and the tone detector 56 is disconnected from the ROTL applique circuit 30. A test progress is then sent from the ROTL applique circuit to the remote test location indicating to the remote test location 10 that the far end responder 80 is connected. In addition, the "bridge" 39 through the ROTL applique circuit 30 between the access port 32 and test port 38 is disconnected.

Figure 1H:
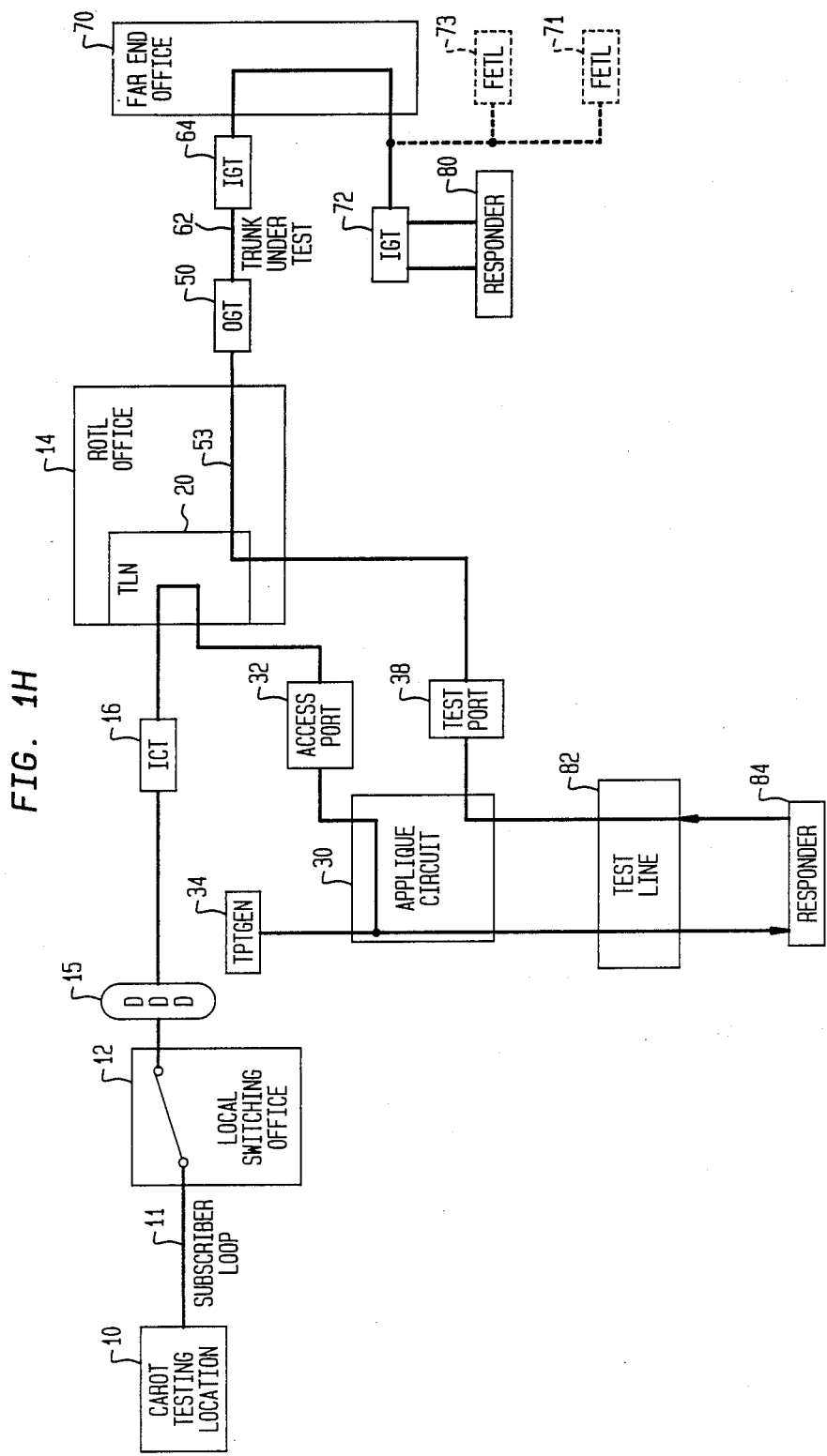

As shown in FIG. 1H, the ROTL program then seizes a test line 82 that is associated with the ROTL applique circuit and places a bid on a particular responder 84 located at the ROTL office 14. When the responder 84 is available, it is connected by way of the test line 82 and ROTL applique circuit 30 to the access port 32 and test port 38 of the ROTL applique circuit. After connection of the responder 84, the last mentioned test progress tone is stopped. The termination of this test progress tone tells the remote testing location that the near end responder is connected and that all connections for the requested test are established and testing can begin.

To carry out the test of the trunk 62, the connection between the near end responder 84 (associated with the near end ROTL office 14) and the far end responder 80 (associated with the far end office 70) is utilized. Illustratively, the near end responder receives type of test information from the CAROT computer at the remote test location 10 via the subscriber loop 11, the local office 12, the direct distance dialing network 15, the incoming trunk 16, the trunk link network 20 of the switching office 14, the access port 32, the ROTL applique circuit 30 and the near end test line 82 The type of test information is communicated from the near end responder 84 to the far end responder 80 via the test line 82, the ROTL applique circuit 30, the test port 38, the trunk link network 20 of the switching office 14, the trunk 62, the far end office 70 and the far end test line 72. One example of a test might be for the far end responder to transmit a particular tone for a particular duration. The tone is then detected by the near end responder which then communicates information concerning any losses to the CAROT computer at the remote test location via bursts at particular frequencies. The CAROT computer than analyzes the results.

It is desirable to reiterate one point concerning the setup of the connection used to perform the above-described test. More particularly, the switch 14 (which illustratively is a No. 1 or No. 1A ESS) sets up the connection to the particular far end test line by transmitting the far end test line directory number. This number is received by the far end switch 14 which then reconfigures its trunk link network (not shown) in response thereto to set up the connection to the particular test line. As is discussed below, this technique cannot be used to set up a connection to test a trunk leading to an automatic call distributor. The reason is that in normal operation a switching office such as a No. 1 or No. 1A ESS does not set up a connection to an ACD by transmitting a directory number indicative of a particular line to be connected to an incoming trunk via the ACD.

Figure 2:
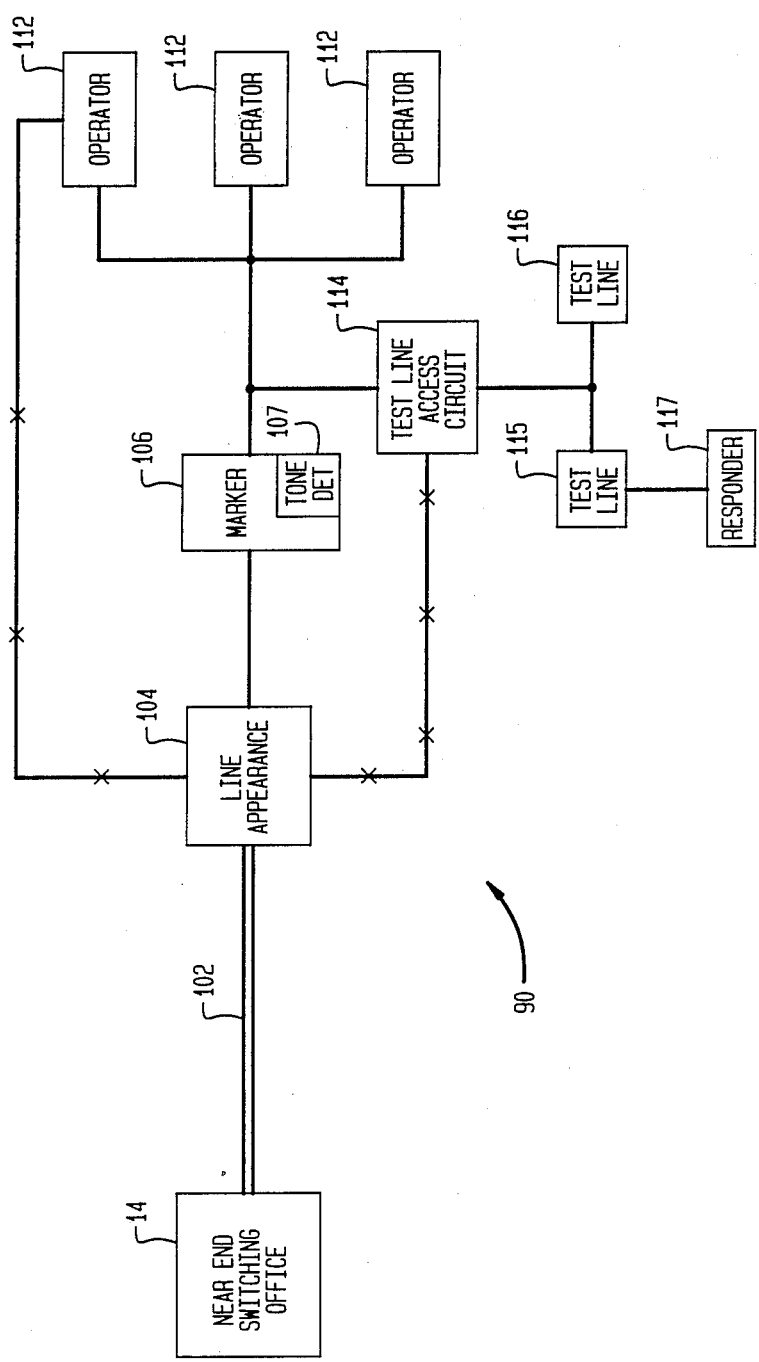
FIG. 2 schematically illustrates an ACD.

The operation of an ACD 90 is schematically illustrated in FIG. 2. Illustratively, the ACD shown in FIG. 2 is used to handle directory assistance (i.e. 411 or 555) calls but a similar ACD may be used to handle, for example, emergency (i.e. 911) calls. The ACD is in reality a special type of crossbar switch. Assume that a request for directory assistance arrives at the near end switching office 14 from a subscriber. To connect the subscriber with a directory assistance operator, the switching office 14, which illustratively is a No. 1 or No. 1A ESS, applies a short circuit to the trunk 102 leading to the automatic call distributor 90. This short circuit is detected by the line appearance circuit 104 and marker circuit 106. The marker circuit 106 serves as a kind of central processor for the ACD cross bar switch. When the marker 106 detects the short circuit, it identifies an available operator position 112 and sets up a path 110 from the line appearance circuit 104 to the available operator position. This enables a subscriber connected to the near end switch 14 to communicate with the available operator position 112. Illustratively, the path 110 passes through a number of cross bar switches designated by the "crosses" comprising the path 10.

The automatic call distributor of FIG. 2 also includes a test line access circuit 114, one or more test lines 115, 116, and responders 117. The test line access circuit, the test lines, and the responders have previously been used in connection with the manual testing of trunks, such as trunk 102, leading to the ACD 90. As indicated above, such manual testing has proven inadequate for proper maintenance of the trunk lines leading to the automatic call distributor. Accordingly, it is desirable to automatically test the trunk lines leading to an ACD from a remote CAROT testing location such as the location 10 of FIGS. 1A-1H.

To this end, it is important to reiterate that in normal operation a near end switching office such as the switching office 14 of FIGS. 1, 2 does not transmit a particular number to achieve a connection to a particular far end test line or a particular operator position associated with the ACD 90. Instead, when the near end switching office wishes to set up a connection to the ACD 90, it applies a short circuit to a trunk leading to the ACD. The short circuit is interpreted as a request for service which is connected to any available operator position, not a particular operator position. Similarly, there is no mechanism for a remote test location in communication with a near end ROTL office to be connected with the test access circuit and particular test line of the ACD after transmitting test priming information indicating that a trunk leading to an ACD is to be tested. Instead, the near end switching office would interpret the test priming information as it would any request for access to the ACD and applies a short circuit to the appropriate trunk leading to the ACD, which short is interpreted by the ACD as a request for service.

This problem is solved in accordance with the present invention. More particularly, this problem is solved by modifying the near end ROTL office to include a trunk interface circuit which enables the ROTL switching office to set up a connection between a remote CAROT testing location and a particular test line of an ACD.

Figure 3:
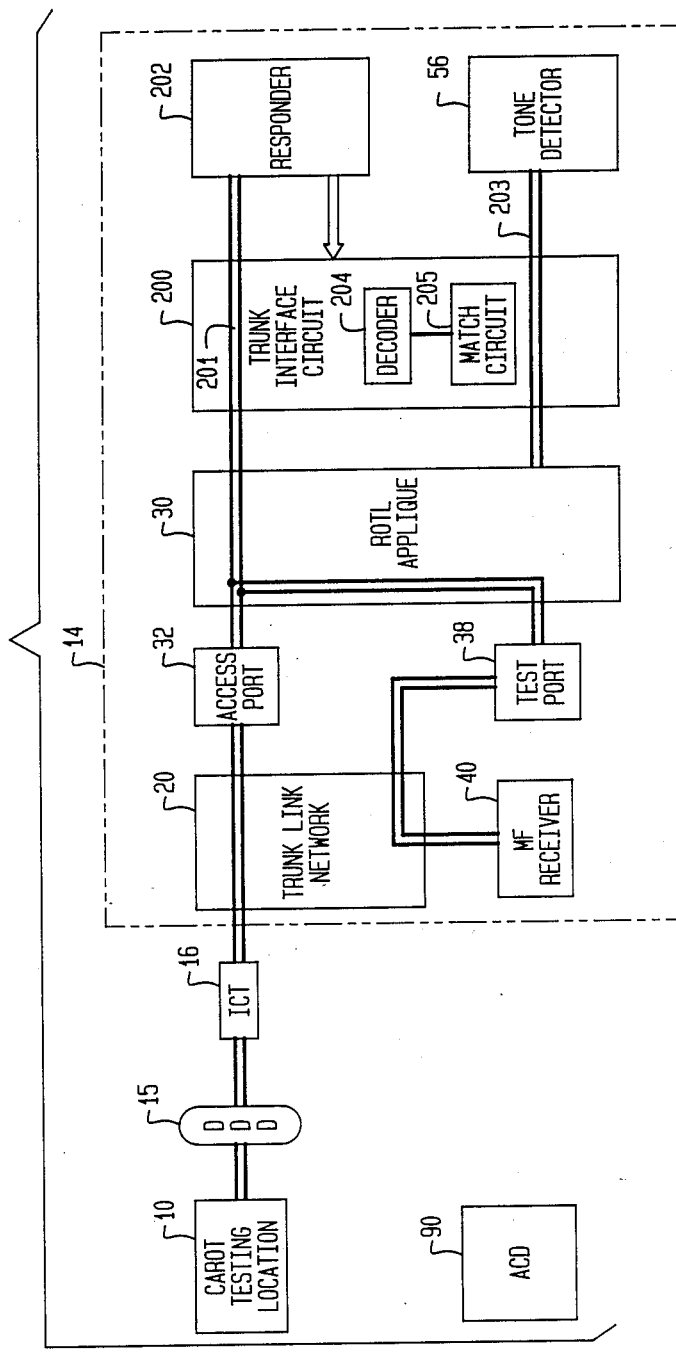
FIGS. 3 and 4 schematically illustrate a trunk interface circuit, which enables a trunk leading to an ACD to be automatically tested when the near end switching office is a No. 1 or No. 1A ESS, in accordance with an illustrative embodiment of the present invention.
Figure 4:
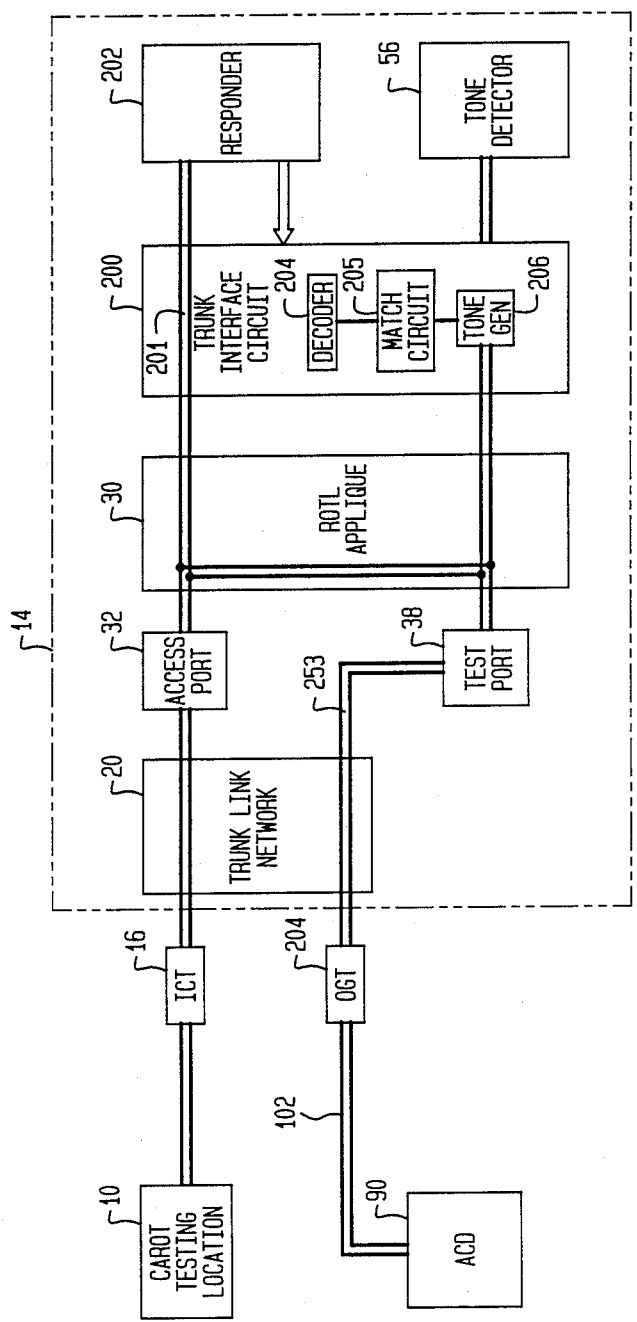

The operation of this trunk interface circuit is illustrated in FIGS. 3 and 4. FIG. 3 shows the configuration of the near end ROTL switching office 14 including a trunk interface circuit 200 when the near end switch is receiving test priming information from the remote testing location 10. As in the case of FIG 1E, the test priming information is transmitted via the DDD network 15, and the incoming trunk 16 to the office 14. The test priming information is transmitted through the trunk link network 20 and enters the ROTL applique circuit 30 via the access port 32. The test priming information is then transmitted to the MF receiver 40 via the test port 38 and the trunk link network 20. The trunk interface circuit 200 provides a "cut through" or "bridge" for the multi-frequency test priming information via the line 201 which is then monitored by an idle responder 202. The responder 202 serves to decode the multi-frequency priming information from frequency levels to a 2 of 6 logic level format. These signals are then transmitted from the responder 202 to the interface circuit 200 for digit decoding by decoder 204. The interface circuit 204 also includes a match circuit 205, which is used to determine if the test priming information indicates a connection is to be established with a far end test line associated with an ACD such as ACD 90 so that a trunk leading to ACD can be tested. Illustratively, the match circuit includes a hard wired representation of a directory number of a far end test line associated with the ACD 90. The interface circuit 200 also provides a "bridge" via line 203 which enables the tone detector 56 to be connected at an appropriate time to the ROTL applique circuits.

Turning now to FIG. 4, the trunk 102 leading to the ACD 90 terminates at the switching office 14 as the outgoing trunk 204. Upon receipt of the test priming information at the switching office 14, the outgoing trunk 204 is reserved for use by the ROTL program. However, in contrast with the procedure used to set up a test of the trunk 62 in FIGS. 1A-1H, the call processing programs of the switching office 14 do not request that a particular directory number be transmitted via the trunk 102 to the ACD 90. Instead, because the trunk 102 leads to an ACD 90, the call processing programs cause only a short circuit to be applied to the trunk 102 which is received in the ACD 90 as a request for service. After the short circuit is applied, the outgoing trunk 204 is connected to the test port 38 of the ROTL applique circuit 30 via the path 253 through the trunk link network.

If the match circuit indicates a trunk leading to an ACD is to be tested (e.g., a 411 or 555 or 911 call), a tone generator 206 is connected through the ROTL applique circuit to the test port 38 which in turn is connected to the ACD 90 via the trunk 102 to be tested. The tone generator 206 transmits a tone via the ROTL applique circuit and via the trunk to be tested to the automatic call distributor 90. This tone is detected by tone detector 10 which forms part of the marker 106 (see FIG. 2) of the ACD. The marker 106 then sets up a connection 111 between the trunk 102 to be tested and the test line access circuit 115. A second tone from the tone generator 206 of FIG. 4 provides information as to which test line 115 or 116 is to be tested. After the connection to the far end test line 115 or 116 is established, the remainder of the test procedure is carried out as discussed above in connection with a standard interoffice trunk. In particular, after the tones are transmitted by the tone generator 206, the tone generator 206 is disconnected and the tone detector 56 is connected to the ROTL applique via the path 203 of FIG. 3 to detect a tone indicating the far end responder 117 is connected.

In short, the trunk interface circuit may be viewed as "tricking" the switch office 14. Normally if the office 14 receives a request to set up a connection via the trunk 102 to the ACD 90, it will apply a short circuit to the trunk 102 which will be interpreted as a request for service in the ACD and a connection will be established to an available operator position. Use of the trunk interface circuit permits tones to be transmitted from the switch 14 to the ACD which causes the ACD to establish a connection to a specific far end test line to enable the trunk leading to the ACD to be tested automatically using CAROT.

Up to now in the discussion of the invention, it has been assumed that the near end office 14 is a No. 1 or No. 1A ESS office. However, the near end office may also a No. 5 cross bar switching office.

Figure 5:
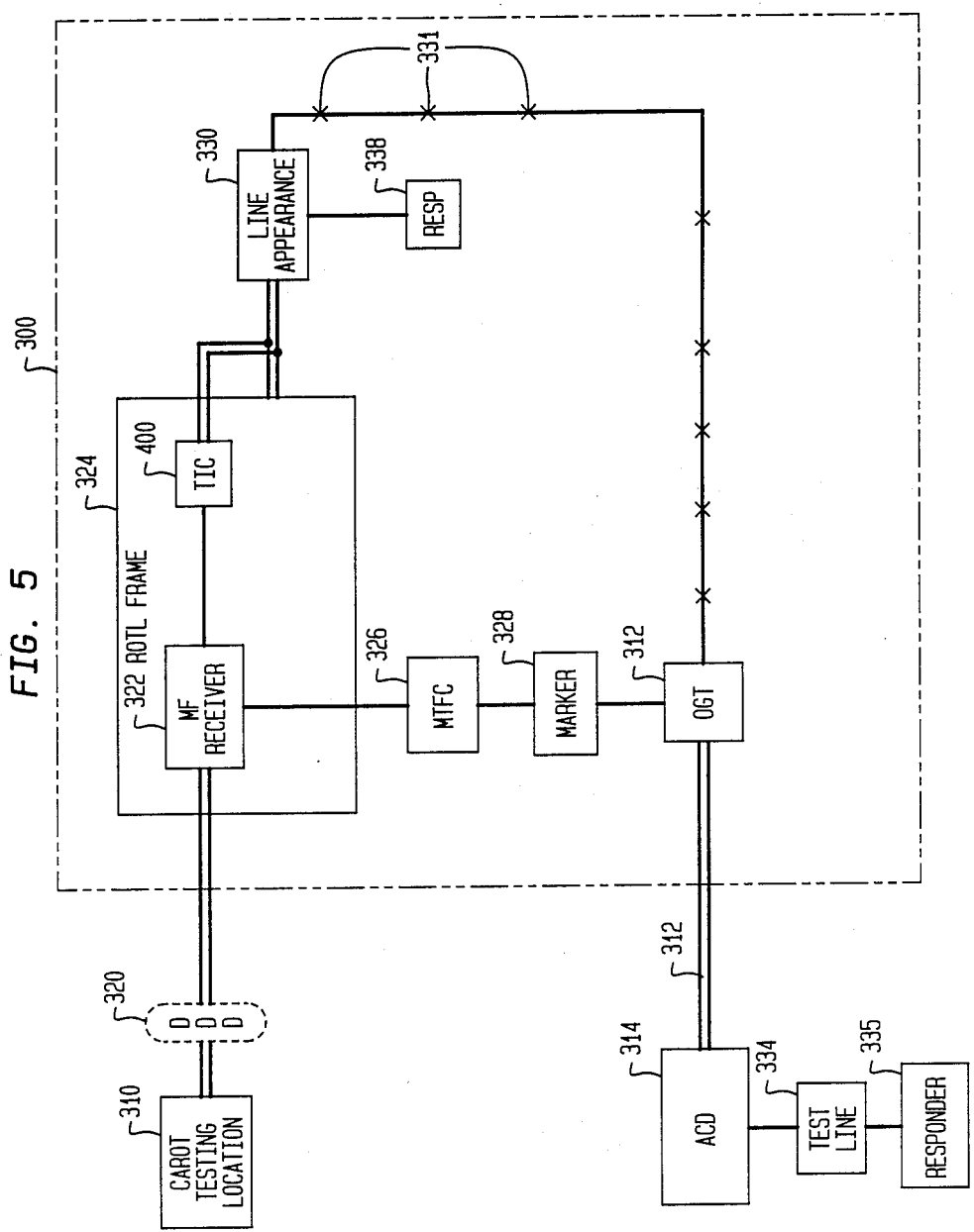
FIG. 5 schematically illustrates how a trunk interface circuit enables a trunk leading to an ACD to be tested when the near end switching office is a No. 5 crossbar switching office, in accordance with an illustrative embodiment of the present invention.

FIG. 5 schematically illustrates how a trunk interface circuit 400 of the present invention may be used in connection with a No. 5 cross bar switch 300 to enable a remote test location 310 to automatically test a trunk 312 leading to an ACD 314. Using a conventional connection setup method, a connection is set up via the direct distance dial (DDD) network 320 of the telephone network to a multi-frequency receiver 322 associated with a ROTL frame 324 in the switching office 300. The remote testing location then transmits test priming information which may include an indication that the trunk 312 leading to the ACD 314 is to be tested. If the ACD is used to handle directory assistance requests, the indicator might be 411 or 555. The indicator is transmitted by the master test frame connector 326 to the marker 328, which marker 328 acts as a kind of central processor for the No. 5 cross bar office 300. The marker 328 causes a connection to be set up between a line appearance circuit 330 and the appropriate outgoing trunk 312. The connection passes through a plurality of cross bar switches 330 which comprises the switching matrix of the switching office 300. The switching office 300 under the control of marker 328 also applies a short circuit to the trunk 312 leading to the ACD 314. As discussed above, the ACD normally interprets the short circuit as a request for service and the marker of the ACD normally sets up a connection between the trunk 312 and an available operator position.

However, such a connection is not suitable for testing the trunk 312 from the remote test location 310. In order to conduct 334 and responder 335 associated with the ACD 314. More particularly, the connection should be set up between the responder 338 associated with the line appearance circuit 330 and the responder 335.

To this end (as in the case of the No. 1 or No. 1A ESS discussed above), the trunk interface circuit 400 monitors the test priming information transmitted from the remote test location, and when an indicator indicating the trunk 312 leading to the ACD 314 is detected, tones are generated by a tone generator in the trunk interface circuit 400. These tones are transmitted via the cross bar switches 331 and the trunk 312 to the ACD. A tone detector in the marker of the ACD detects the tones and establishes the connection to the test line 334 rather than to an available operator position.

Finally, the above-described embodiments of the invention are intended to be illustrative only. Numerous alternative embodiments may be devised by those skilled in the art without departing from the spirit and scope of the following claims.

We claim:

1. A circuit for use in a switching office of a telephone network to enable a trunk leading to an automatic call distributor to be automatically tested from a remote testing location, said circuit comprising:

means for determining if test priming information transmitted from said remote testing location to said switching office contains an indication that a trunk leading to an automatic call distributor is to be tested, and signalling means for transmitting a signal via the trunk to be tested to the automatic call distributor to cause a connection to be set up between the switching office and a test line associated with said automatic call distributor so that said trunk can be automatically tested from said remote testing location.

2. The circuit of claim 1 wherein said signalling means comprises a tone generator.

3. The circuit of claim 2 wherein said tone generator generates a first tone to indicate a trunk line leading to an automatic call distributor is to be tested and a second tone to indicate a specific test line associated with the automatic call distributor.

4. A circuit for use in a switching office of a telephone network to enable a trunk leading to an automatic call distributor to be automatically tested under the control of a computer located at a remote testing location, said circuit comprising means for enabling test priming information transmitted from said remote testing location to be monitored by a responder circuit located in said switching office, matching means for determining if said test priming information indicates a trunk leading to an automatic call distributor is to be tested, and tone generating means for transmitting a tone via said trunk to said automatic call distributor to cause a connection to be established between a test line associated with said automatic call distributor and said switching office rather than a connection between an operator position associated with said automatic call distributor and said switching office.

5. The circuit of claim 4 wherein said circuit further comprises decoding means for decoding test priming information monitored by said responder for use by said matching means.

6. The circuit of claim 4 wherein said automatic call distributor is used to distribute requests for directory assistance to available operator positions.

7. A method for automatically testing a trunk leading to an automatic call distributor under the control of a computer located at a remote testing location in a telephone network, said method comprising the steps of transmitting test priming information from said remote testing location to a switching office of said telephone network, monitoring said test priming information at said switching office to determine if said test priming information indicates a trunk leading to an automatic call distributor is to be tested, if a trunk leading to an automatic call distributor is to be tested, generating at least one tone and transmitting said tone to said automatic call distributor, and detecting said at least one tone at said automatic call distributor to automatically set up a connection between a test line associated with said automatic call distributor and said switching office so that said trunk leading to said automatic call distributor can be tested automatically under the control of said computer from said remote testing location.

8. The method of claim 7 wherein said generating step comprises generating a first tone to indicate said trunk line leading to said automatic call distributor is to be tested and a second tone to identify a particular test line associated with said automatic call distributor.

9. A method for automatically testing a trunk leading to an automatic call distributor from a remote testing location in a telephone network comprising the steps of:

establishing a connection between said remote testing location and a switching office adapted for carrying out remote testing of trunks, transmitting test priming information from said remote testing location to said switching office, monitoring said priming information in said switching office to determine if said test priming information indicates a trunk line leading to an automatic call distributor is to be tested, and if a trunk line to an automatic call distributor is to be tested, signalling said automatic call distributor so a connection via said trunk is set up between said switching office and a test line associated with said automatic call distributor rather than between said switching office and an operator position associated with said automatic call distributor.

10. The method of claim 9 wherein said signalling step comprises generating at least one tone which is transmitted to said automatic call distributor.

* * * * *